United States Patent Office 3,484,837
Patented Dec. 16, 1969

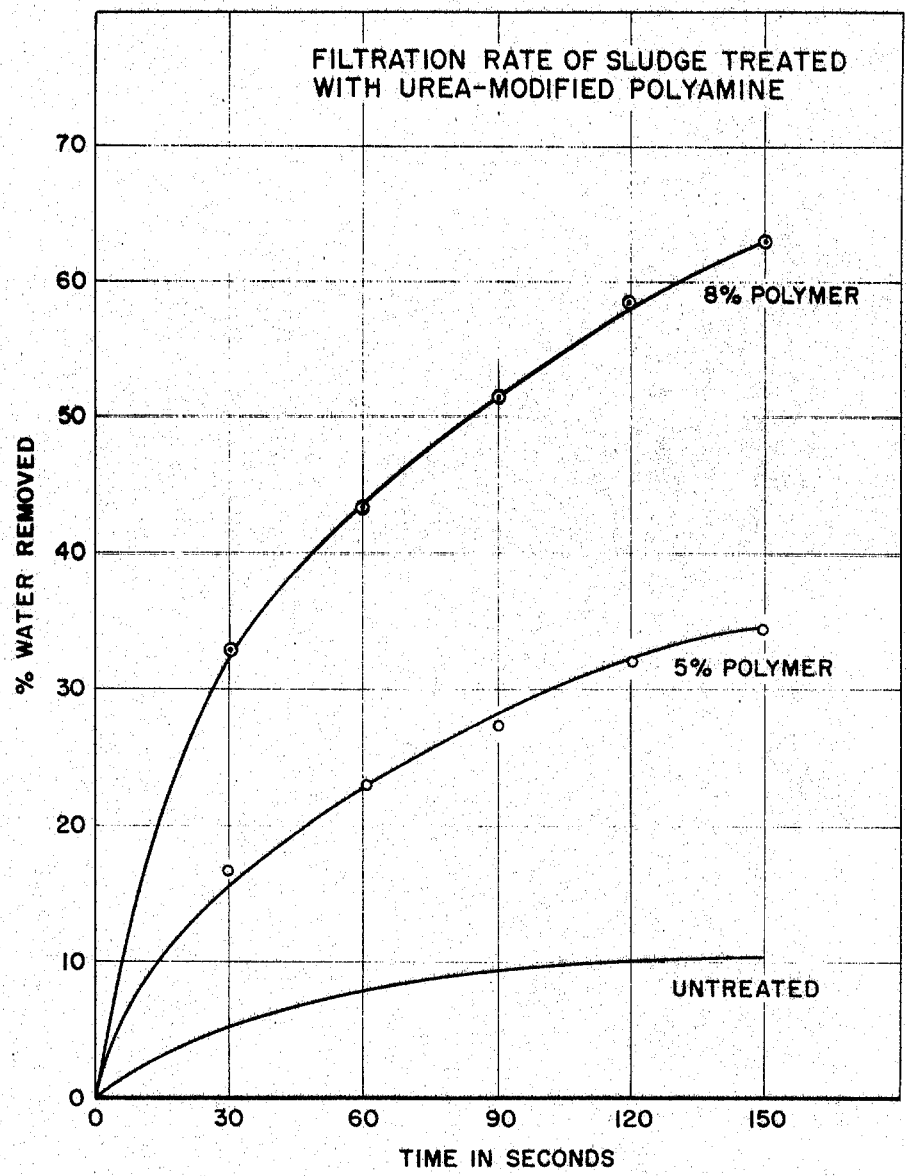

3,484,837
PROCESS FOR REMOVAL OF INORGANIC AND ORGANIC MATTER FROM WASTE WATER SYSTEMS
James J. Odom, Thomas P. Shumaker, and Paul R. Bloomquist, Tuscaloosa, Ala., assignors to Reichhold Chemicals, Inc., White Plains, N.Y.
Continuation-in-part of application Ser. No. 591,404, Nov. 2, 1966. This application Sept. 9, 1968, Ser. No. 758,333
Int. Cl. C02b 1/18
U.S. Cl. 210—52                              11 Claims

ABSTRACT OF THE DISCLOSURE

A process and agents are provided for removal of both inorganic and organic contaminants from waste water systems. Thèse systems are treated with a water-soluble, cationic, amine-containing synthetic resin to effect removal of inorganic salts such as phosphates, borates, and the like; partially or wholly non-biodegradable detergents such as alkyl benzene sulfonates and linear alkyl sulfonates; and organic materials such as decayed plant life, other nitrogen-bearing substances, phenol derivatives, and the like.

---

This application is a continuation-in-part of our copending application Ser. No. 591,404, filed Nov. 2, 1966, and now abandoned.

This invention relates to the removal of organic and inorganic contaminants from water systems. More particularly, the invention relates to the purification of waste water systems by the treatment of such systems with improved agents for the removal of detergents and other undesired organic and inorganic materials. By "waste" water systems is meant any influent or effluent water streams containing detergents or other undesired organic or inorganic contaminants.

This invention also relates to the purification of waste water systems by the removal from them of turbidity-producing materials, for example, colloidal particles derived from lower plant life, microorganisms and the like.

A large portion of the inorganic contaminants in waste water systems have their origin in widely used domestic detergents, such as phosphate and borate-containing detergents. Phosphates and borates are major constituents in many domestic and industrial detergents, and are, therefore, major contributors to pollution of waste water systems. These phosphate and borate compounds are not biodegradable, and thus are not consumed by the bacteria normally present in soil and sewage.

Further, presently used waste treatment processes are not normally effective for the removal of phosphates, borates and other inorganic contaminants. In addition to inorganic phosphate and borate detergents, the phosphates present in fertilizer compositions, metal cleaning and boiler water treating compounds, and the like also find their way into effluent streams from industrial sources and further contribute to the inorganic contaminant content of such water streams.

Recent industrial use of chromate and molybdate salts has also been on the increase due to the utility of these salts in metal plating processes, in cooling towers to prevent formation of algae, and in chemical and metallurgical industrial processes. These chromate and molybdate salts are also non-biodegradable and hence are not removed by conventional waste water treatment processes. They therefore further contribute to inorganic contamination of waste water systems.

Many organic contaminants of waste water systems occur naturally. They are humin, ulmin, urea derivatives, and generally speaking, nitrogen-bearing substances derived from decay products of plant life, animal excrements and the like. Other organic contaminants find their way into waste water streams from diverse industrial and domestic sources. For example, phenol and phenol derivatives are formed by bacterial degradation of organic matter, and are also used directly as important industrial and domestic disinfectants. Phenols from both sources eventually find their way into waste water systems.

A primary source of organic contamination of streams and other water systems has been caused by synthetic organic detergents. In the past, the synthetic detergents largely used in both home and industrial cleaning were alkyl benzene sulfonates, such as tetrapropylbenzene sulfonate. While these compounds, known as "hard" detergents, have very efficient and desirable cleaning properties, their use has created substantial problems of water contamination and pollution.

This problem results from the fact that the bacteria normally present in soil and sewage do not consume detergents. Such bacterial action had always been sufficient to achieve substantially complete degradation of the conventional fatty and soap products. The failure of bacterial action to consume these sulfonate detergents in the usual manner, meant that the detergents were not removed in sewage treatment plants and home septic tanks, and remained in ground water and the water returned to rivers and streams.

Although these detergents are not toxic to humans, their presence is highly undesirable in drinking or swimming water or the like, and there is some evidence that they are also harmful to aquatic life.

Previous attempts to solve the water pollution problem resulting from the use of alkyl benzene sulfonate detergents have proceeded in two diverse directions. Many attempts have been made to devise procedures and equipment to effectively remove these non-biodegradable detergents from waste water systems. These procedures have largely utilized treating units to reduce the detergent level in discharge waste water from commercial laundries and other similar facilities which utilize large quantities of such detergents.

Additional attempts have been made, on a larger scale, by detergent manufacturers, governmental agencies, and industry as a whole to develop a satisfactory process for the removal of non-biodegradable detergents from water streams. Unfortunately, none of this prior art work has produced a satisfactory solution to the detergent water-pollution problem.

Another approach to this problem has been the attempt by the detergent industry to provide detergents which are biodegradable so that they can be removed from waste water streams by the same techniques that previously had been successful in the removal of fatty acid type soaps. The so-called "soft" detergents, which were recently developed as a result of this work, were originally believed to solve detergent water-pollution problems. These soft detergents are generally linear alkyl sulfonates, such as for example sodium dodecyl sulfonate.

Although linear alkyl sulfonates are biodegradable, it has been found that their biodegradability is largely dependent upon aerobic conditions or the presence of free oxygen, and that these soft detergents largely maintain their original form under anaerobic conditions or the absence of free oxygen. Thus, while linear alkyl sulfonate detergents can be effectively removed by conventional bacterial action in surface water, they are not effectively removed by bacterial action from streams discharged into the ground from cesspools, septic tanks and the like, where the water is not exposed to air.

Hence, even these now soft detergents create a considerable ground-water pollution problem. While several procedures have been proposed for the elimination of these soft, linear alkyl sulfonate detergents from water systems, none of these procedures have achieved equal effectiveness in the removal of both such soft detergents and the more widely used alkyl benzene sulfonate (hard) detergents.

Some of the aforementioned water contaminants impart color to waste water streams. These color-bearing bodies may be of either inorganic or organic nature, and are difficult to eliminate from waste water streams by conventional filtration or sedimentation procedures. Other of the contaminants referred to above cause a foaming in waste water systems and are therefore also desirably removed from these systems.

Many attempts have been made to solve the problem of contaminant removal from waste water systems. Procedures involving coagulation, filtration, ion exchange treatment and other complex and expensive procedures have been tried. No satisfactory answer to the water pollution problem caused by such contaminants has as yet been achieved.

It is therefore a primary object of this invention to provide a new and improved process for the removal of inorganic and organic contaminants from waste water systems.

Another object of this invention is to provide improved agents for the removal of inorganic and organic contaminants from waste water systems.

A further object of this invention is to provide a new and improved process and new and improved agents for removal of inorganic and organic contaminants of waste water streams through the formation of complex, insoluble reaction products with such inorganic and organic contaminants, thereby reducing these contaminants to a form in which they can readily be removed from the waste waste water systems.

A still further object of one embodiment of this invention is to provide a new and improved process for the removal of detergents from water systems.

Yet another object of one embodiment of this invention is to provide improved agents for the removal of detergents from water systems.

A further object of one embodiment of this invention is to provide a new and improved process for the removal of both alkyl benzene sulfonate (hard) detergents and linear alkyl sulfonate (soft) detergents from waste water systems.

A further object of one embodiment of this invention is to provide an improved process for the removal of hard and soft detergents from waste water systems, which includes the addition of a removal agent to such water systems to react with the detergents and produce an insoluble precipitate or flocculate which can be readily removed from the water system by conventional classification procedures.

Yet another object of this invention is to provide a new and improved process for the removal of inorganic and organic matter, including detergents, from waste water systems which can be effectively used to purify effluent waste streams, such as individual home sewage systems or industrial waste streams, as well as influent streams to industrial water treatment systems and to municipal water treatment plants and the like.

Still another object of this invention is to provide a new and improved agent for the removal of organic and inorganic contaminants from waste water streams which acts as a stimulant for the bacterial action occurring in typical sewage systems, thereby beneficially acting to further reduce the overall solids content of such waste water systems.

Yet another object of this invention is to provide a process for improved filtration and dewatering of sewage sludge.

Additional and further objects and advantages of this invention will be set forth in part in the description that follows, and in part will be obvious therefrom or may be learned by practice of this invention, such objects being realized and attained by means of the steps, methods, compositions, combinations and improvements pointed out in the appended claims.

To achieve the foregoing objects and in accordance with its purpose, as embodied and broadly described, the process of this invention comprises treating waste water streams containing organic and inorganic impurities with a water-soluble, cationic, amine-containing synthetic resin. The amine-containing resinous removal agents of this invention react with anionic material present in such water systems to produce an insoluble reaction product which can be readily removed from the water by conventional classification means, such as filtration, settling and decantation, and the like.

In accordance with a preferred embodiment of this invention the present process comprises treating detergent-containing water streams with a water-soluble, cationic, amine-containing synthetic resin. The amine-containing resinous removal agents of this invention react with both alkyl benzene sulfonate and linear alkyl sulfonate detergents present in such water systems to produce an insoluble reaction product which can be removed from the waste streams by the conventional means described above.

Finely dispersed organic and inorganic solids in the waste water streams are converted into larger lumps through the action of the removal agents of this invention in much the same manner that pigments are flocculated. The exact mechanism of this flocculation is not known, but it can be theorized that the cationic sites in the polymer chain attract anionically charged particles causing numerous fine particles to agglomerate into large flocs.

This flocculation causes rapid settling or sedimentation of the undesired organic or inorganic solid contaminants and allows easy removal of such flocs by conventional filtration procedures. Particles of a non-anionic nature are also caught up in this process of agglomeration and caused to settle out along with the flocculated particles.

The drawing is a graph showing the improvement in sewage sludge filtration rates achieved by use of the cationic amine resins of this invention.

The contaminant removal agents utilized in the process of this invention are water-soluble, and readily water-dispersible liquid resins. Thus these agents can be added to waste water systems either in their undiluted form, or in an aqueous solution. Of course, these resins are generally also soluble in common organic solvents such as methanol, ethanol, isopropanol, ethylene glycol, furfuraldehyde, furfuryl alcohol and the like, and can be added to the waste water systems in solution in such solvents, if desired.

The improved contaminant removal agents used in the process of this invention are cationic, amine-containing resins containing a plurality of reactive amino groups. These resins are preferably amine-aldehyde resins containing a plurality of reactive amino groups.

Without being limited to any particular theory, it is believed that the present process for the removal of inorganic and organic substances from waste water systems is based on a reaction between the reactive amino groups of the cationic, amine-containing resinous removal agents and the anionic moiety of the contaminant. Thus, in the removal of sulfonate detergents from waste water systems in accordance with the present process, the reaction is believed to occur between the reactive amino groups of the cationic, amine-containing resinous removal agent and the sulfonic acid radical portion of the detergent compositions.

Alkyl benzene sulfonate and linear alkyl sulfonate detergents are generally used as the alkali metal salts of the corresponding alkyl benzene sulfonic acids and alkyl sulfonic acids, respectively. It is believed that the reaction between the removal agents of this invention and these detergents is a complex equilibrium reaction, with the alkali metal sulfonate dissociating in an aqueous system to the corresponding alkali metal ion and sulfonic acid ion. This sulfonic ion then becomes attached to the cationic amine-containing resin through an equilibrium type reaction at a point of available amine linkage.

As this equilibrium reaction continues, the resulting compound ceases to be water soluble because of the molecular weight of the amine-containing resinous removal agent and the many available points for addition of the acid complex through reactive amino groups. Thus, as the reaction continues the resulting insoluble compound can be observed as a flocculent mass in the solution. Depending upon the concentration of this reaction product, it may be observed as either a slight haze in the solution, indicating the colloidal or macro-molecular nature of the reaction product, or it may actually form an agglutinous, flocculent, precipitate material.

It will be appreciated that similar reactions are also believed to occur between the removal agents of this invention and the anionic moieties of other organic and inorganic contaminants present in waste water systems.

Exemplary of the preferred amine-aldehyde resinous removal agents of this invention are:

(a) polyamine-modified urea-formaldehyde resins; and
(b) melamine-formaldehyde resins.

Both of these classes of resins afford the necessary properties for the removal agents of this invention; i.e., they are water-soluble, cationic resins containing the plurality of reactive amino-groups required for the formation of the desired insoluble complexes with the anionic impurities or contaminants in the waste water system, such as for example, the sulfonate detergent impurities present in such systems.

Any suitable polyamine modifier can be used in the modified urea-formaldehyde resins used in accordance with this invention. For example, dicyandiamide, diethylene triamine and melamine or mixtures thereof are suitable polyamine modifiers. The preparation of these modified urea-formaldehyde resins, and the melamine-formaldehyde resins used in the present process will be further described by the working examples which follow, and illustrate in detail the preparation of these resins.

As pointed out above, the detergent removal agents of this invention can be added to the waste water system being treated in any suitable form, either undiluted, or in aqueous solution. They are preferably added in dilute equeous solution. For example, the cationic, amine-containing resins of this invention can be added to the waste water systems being treated in the form of aqueous solutions containing about 0.5 to 3.5% by weight of resin solids.

The amount of resinous removal agent added to the waste water system being treated can vary widely, depending on the treatment system in which the resin is used, i.e., whether it is a primary or secondary treatment system; the amount of waste water to be treated; the permissible dwell time in the treatment system; and the degree of contaminant removal desired in the system. Examples are presented herein showing the use of the process of this invention in both primary and secondary sewage treatment systems, and from the foregoing description and these examples, the amounts of treatment agent to be added to various types of systems will be readily apparent to those skilled in the art.

It has been found that the settling rate of the colloidal precipitate formed between the resinous removal agents of this invention and the contaminants, such as detergents, present in the waste water systems can be increased by the additional use of acidic alum solutions, and while the use of such alum solutions is not required, it is preferred. If alum is used, it is normally added to the system in a dilute aqueous solution.

As pointed out above, the flocculent material formed by the reaction of the treatment agents of this invention and the contaminants present in the waste water systems being treated normally settles or precipitates out of the systems. Because of their colloidal character, these reaction products tend to cause other solids in the system to settle along with them. Thus the process of this invention is advantageous in reducing not only the anionic solids content of the waste water systems being treated, but also the non-anionic solids content of these systems. This action, of course, greatly enhances the overall purification efficiency of the process of this invention.

The present process is particularly effective in the removal of both hard and soft detergents from waste water systems, and affords important incidental benefits which are not present in the processes heretofore devised for detergent removal. One of these advantages is that *both* hard and soft detergents can be removed by the process of this invention.

Another advantage lies in the substantial amount of detergent that can be removed by this process. Thus, it has been found that an effective removal of from about 50 to 90% of the original detergent content of waste water systems can be achieved by the process of this invention.

The present process not only removes organic sulfonate detergent contaminants from waste water systems but also removes a wide variety of inorganic contaminants such as phosphates, borates, chromates and molybdates, and many organic impurities of both natural and synthetic origin. Thus in addition to the hard and soft detergents discussed above, the present process can be used to remove phenol impurities, both those produced by natural bacterial degradation of organic matter and those originating from industrial and domestic sources, such as those used as disinfectants and the like. Other organic contaminants such as humin, ulmin, urea derivatives and other nitrogen substances derived from the decay of plant products, animal excrements and the like are also effectively removed from waste water systems by the process of this invention.

An additional advantage of this system is that the treatment agents of this invention have been found to have a stimulating effect on the action of bacteria in typical sewage treatment systems. This stimulating effect on bacterial action is particularly important, since the failure of bacteria to consume both hard and soft sulfonate detergents has been a primary shortcoming of these detergent compositions.

The present invention also provides an improved process for the filtration and dewatering of sewage sludge. Thus, it has been found that the addition of the cationic, polyamine treatment agents of this invention to sewage sludge allows more rapid filtration and removal of water from the sludge than has been heretofore possible. The mechanism by which this phenomenon occurs is not known, but it is believed that the agglomeration effect produced by the presence of the amine polymer of this invention in the sludge improves filtration while actually expelling water from the sludge and thereby "dewatering" it.

To illustrate the present invention more specifically, reference is now made to the specific examples that follow. These examples are nonlimiting and illustrate the preparation of certain of the resinous contaminant-removal agents of this invention, and the treatment of various waste water systems with these agents in accordance with the process of this invention.

Examples 1–4 illustrate the production of the resinous contaminant-removal agents of this invention.

Examples 5–12 illustrate the removal of both hard and soft detergents from waste water systems with these agents. It is to be understood that, in practice, as in the large-scale treatments illustrated by Examples 11 and 12, mixed detergent compositions will usually be present in the system being treated, because of the many different sulfonate detergents currently in use.

The present process is, however, suitable for the removal of all such detergents including the alkyl benzene sulfonates such as sodium tridecylbenzene sulfonate, sodium dodecylbenzene sulfonate, dodecylbenzene sulfonic acid, tetrapropyl benzene sulfonate and the like; linear alkyl sulfonates such as sodium dodecyl sulfonate, sodium octadecyl sulfonate and the like; alkaline earth metal salts of lignosulfonates, such as calcium and magnesium lignosulfonates; and some nonionic detergent ingredients such as sodium metasilicate, sodium tripolyphosphate, and partial sodium carbonate.

Examples 13–21 illustrate the removal of various organic and inorganic contaminants, other than detergents, from waste water streams in accordance with the process of this invention, and also illustrate the reduction in the total solids content of such streams achieved through the use of this process. These examples illustrate the use of the removal agents and process of this invention in both primary and secondary sewage treatment systems.

Example 22 and the drawing illustrate the improved sewage sludge filtration and dewatering achieved using the cationic amine treatment agents of this invention.

Whenever the term "parts" or "percent (%)" is used in this specification or in the appended claims, it is intended to mean parts or percent by weight, unless otherwise specifically indicated.

The detergent content of the samples referred to in certain of the following examples is established using the U.S. Public Health Service methylene blue method.

The "total solids" content of various waste water samples referred to in the examples is determined by evaporating a representative sample of the waste water to dryness at 103° C. The "total volatile solids" are determined by taking the dried sample, igniting it to a constant weight at 600° C., and determining the weight loss through ignition. The weight lost in ignition is the "total volatile solids" and the remaining solids are termed the "fixed residue."

"Total suspended solids" content is determined by filtering a waste water sample through an asbestos mat in a Gooch crucible. The crucible and mat are then dried at 103° C. for one hour and weighed. The weight gain over the original weight of the mat and crucible gives the "total suspended solids" content of the solution filtered. The "volatile suspended solids" and "fixed residue of suspended solids" content are determined by ignition of the "total suspended solids" in the manner described above.

The "total dissolved solids" content of a waste water system is determined by subtracting the "total suspended solids" from the "total solids." The volatile and residue portions of the "total dissolved solids" is also determined by 600° C. ignition.

EXAMPLE 1

A stainless steel reactor is charged with 7,985 parts of 37% formaldehyde, inhibited with 7.5% methanol. To the reactor are then added 241 parts of dicyandiamide, 280 parts of diethylene triamine, 600 parts of water and 370 parts of 20° Bé. hydrochloric acid. These ingredients are stirred into the formaldehyde in the reactor and the batch is reacted for 2 hours at 90° C. The reaction mixture is then cooled to 50° C. and 2,200 parts of urea are stirred in and reacted for 1 hour at 75° C. The pH of the mixture is then adjusted to 3.5 with 20° Bé. hydrochloric acid and the reaction mixture again reacted for 45 minutes at 75° C.

The temperature of the resulting reaction mixture is then reduced to 55° C. and the mixture is held at this temperature until a Gardner-Holdt viscosity of "H" is reached. An additional 764 grams of 37% formaldehyde (inhibited with 6% methanol) are then added to the reaction vessel, and the reaction is continued at 55° C. for 2 hours. The pH of the reaction product is adjusted to 7.6 with a solution of 9% sodium hydroxide solution, and the specific gravity of the reaction product is adjusted to 1.140 with water. On cooling to room temperature the batch comprises a modified urea-formaldehyde resin suitable for use in the contaminant removal process of this invention.

EXAMPLE 2

A stainless steel reactor is charged with 11,500 parts of 37% formaldehyde inhibited with 7% methanol. The pH of the formaldehyde is adjusted to 8.0 with sodium hydroxide, and 5,895 parts of melamine crystals are added to the reaction vessel. This mixture is reacted at 90° C. for 1 hour, and its temperature is then reduced to 85° C. and the reaction allowed to continue until a 50% water tolerance is reached. The pH of the reaction product is adjusted to 9.4 with sodium hydroxide. The resin product is then converted to 10% acid colloid by the addition of 3,600 parts of 18° Bé. hydrochloric acid, 18,400 parts of 37% formaldehyde, and 61,500 parts of water. The resulting product is a melamine-formaldehyde resin suitable for use in the contaminant removal process of this invention.

EXAMPLE 3

A stainless steel reactor is charged with 1,431 parts of 44% formaldehyde and 2,402 parts of methanol. The pH of this mixture is adjusted to 9.0 with sodium hydroxide. 4,215 parts of paraformaldehyde are then added to the reactor and the mixture heated to 80° C. The pH of the mixture is then adjusted to 8.0 with formic acid and 3,363 parts of melamine crystals are added to the batch over a 45 minute period. 1,601 parts of urea are then added, and the reaction mixture is heated at 80° C. until it becomes clear.

The temperature of the reaction mixture is then reduced to 75° C., and it is held at that temperature until a "hydrophobe" develops. The formation of the "hydrophobe" is achieved when polymerization progresses to the stage that 2 or 3 drops of resin in 100 ml. of water produce a white haze or cloud when cooled to 0° C. After formation of the hydrophobe, the pH of the reaction product is adjusted to 9.0 with sodium hydroxide, and the reaction product is cooled to room temperature. The resulting product is a melamine modified urea-formaldehyde resin suitable for use in the process of this invention.

EXAMPLE 4

A stainless steel reactor is charged with 11,530 parts of 37% formaldehyde containing 1% methanol, 503 parts of diethylene triamine and 3,340 parts of urea. This reaction mixture is heated at 90° C. for 20 minutes, and 450 parts of 22° Bé. hydrochloric acid and 560 parts of water are added to adjust its pH to 4.1. The batch is then reacted at 95° C. for 90 minutes and is subsequently diluted with 620 parts of water and reacted at 80° C. until a Gardner-Holdt viscosity of "Q–S" is achieved. The reaction mixture is again diluted with 620 parts of water and reacted at 80° C. until the "Q–S" viscosity is again achieved.

The batch is then diluted a third time with 620 parts of water and reacted at 75° C. until the "Q–S" viscosity is again reached. A fourth dilution with 620 parts of water is then carried out, and the batch is thereafter reacted at 70° C. until a Gardner-Holdt viscosity of "U–V" is reached. The reaction product is then further diluted with 4,480 parts of water and its pH is adjusted to 6.9 with sodium hydroxide. The resulting product is a modified urea-formaldehyde resin suitable for use in the contaminant removal process of this invention.

EXAMPLE 5

Twenty-five (25) ml. of a solution containing 10 p.p.m. sodium tridecylbenzene sulfonate is diluted to 250 ml. with tap water, to produce a final solution containing 1 p.p.m. of the sulfonate detergent. To this detergent solution are added 3 ml. of a 1% solution of the dicyandiamide and diethylene triamine modified urea-formaldehyde resin produced in Example 1 and one (1) ml. of a 1% solution of papermaker's alum. The colloidal product formed is removed from the solution by filtration. The alkyl benzene sulfonate detergent content of the resulting purified water is found to be reduced to 0.45 p.p.m.

EXAMPLE 6

The procedure of Example 5 is duplicated in this example, except that the sulfonate detergent in the solution being treated is a linear alkyl sulfonate detergent—sodium dodecyl sulfonate. Substantially similar results to those achieved in Example 1 are obtained in this example.

EXAMPLE 7

Twenty-five (25) ml. of an aqueous solution containing 100 p.p.m. sodium dodecylbenzene sulfonate is diluted to 250 ml. with tap water, so that the final solution contains 10 p.p.m. of the sulfonate detergent. A mixture of 3 ml. of a 1% solution of the polyamine-modified urea-formaldehyde resin produced in Example 1, and one (1) ml. of a 1% solution of papermaker's alum is added to this detergent solution. The resulting colloidal product is removed from the solution by filtration, and the detergent content of the treated water is found to be reduced to 2.0 p.p.m.

EXAMPLE 8

The procedure of Example 7 is duplicated in this example on two (2) detergent-containing samples, using as detergent removal agents the melamine-modified urea-formaldehyde resin produced in Example 3 and the diethylene triamine modified urea-formaldehyde resin produced in Example 4. The results achieved with these two (2) samples are substantially similar to those achieved in Example 7.

EXAMPLE 9

Four (4) ml. of a 1% by weight aqueous solution of dodecylbenzene sulfonic acid is diluted to 995 ml. with distilled water. A mixture of 4 ml. of a 1% solution of the modified urea-formaldehyde resin of Example 1 and 0.5 ml. of a 1% papermaker's alum solution is then added to this detergent-containing solution.

A control sample is made, for comparison purposes, by diluting 4 ml. of a 1% solution of dodecylbenzene sulfonic acid to 999 ml. and adding to the solution 0.5 ml. of a 1% solution of papermakers' alum.

Both the control and treated samples are allowed to stand for 4 hours at room temperature, and are then filtered through a 5 micron filter pad. 500 ml. samples of both the control and treated solutions are then evaporated to dryness in a tared porcelain evaporating dish, and their dissolved solids analyzed.

The control sample yields 20.6 parts by weight of solids (41.2 p.p.m.) and contains 39 p.p.m. of sulfonate detergent. The sample treated in accordance with the process of this invention yielded 12.2 parts by weight of solids (24.4 p.p.m.) and contains only 19.0 p.p.m. of sulfonate detergent.

EXAMPLE 10

A detergent solution containing 10 p.p.m. of alkyl benpene sulfonate detergent is prepared and divided into four 250 ml. samples. To these four (4) samples are added respectively, 1, 2, 4 and 8 ml. of the acid colloid melamine-formaldehyde resin prepared in Example 2. The solutions are then filtered to remove the fluocculate formed on the addition of the melamine-formaldehyde resin, and the resulting solutions are analyzed for alkyl benzene sulfonate detergent content. The samples are found to contain respectively, 9.0, 1.8, 1.6 and 1.5 p.p.m. of alkyl benzene sulfonate detergent, as opposed to the original 10 p.p.m. content of each sample.

EXAMPLE 11

This example illustrates the use of the detergent removal process of this invention in a primary type sewage treatment system. In primary treatment systems collected sewage waste is treated by the following procedure:

(1) The oversize solid material is removed by screening and treated separately from the material which passes through the screen.

(2) The material passing through the screen goes to a comminuting machine which reduces it in size.

(3) From the comminutor the waste stream is routed to settling tanks for removal of high gravity solid material by rapid settling.

(4) The overflow from the first settling tanks is taken to main settling tanks for a 4–5 hour dwell time to permit the removal of slower settling solids. Additional solids may be removed in these main settling tanks by classification equipment.

(5) The overflow from the main settling tanks is discharged from the system.

The primary settling system is largely an undissolved solids removal system, which includes no substantial attempt to remove solids through bacterial action. In the present example, quantities of the detergent removal agent of this invention, more particularly the modified urea-formaldehyde resin produced in Example 1 are added at step 2 of the primary sewage treatment procedure, where the screened intake is passed through the comminutor for size reduction. The action of the detergent removal agent thus occurs from the time of its addition in step 2 of the procedure until the insoluble precipitate is removed in step 4 by the classification equipment and the precipitation of other solids in the system.

In this example a primary system which processes about 6,000,000 gallons per day of waste water, having an original alkyl benzene sulfonate detergent content of 15.0 p.p.m., is utilized for detergent removal in accordance with the process of this invention by the addition in the cutting step of about 977 pounds per day of the detergent removal resin produced in Example 1. Analysis of the overflow stream discharged from the overall system shows that the water exiting the system contains an average of only 0.5 p.p.m. of alkyl benzene sulfonate detergents, as compared to the original 15.0 p.p.m. content.

EXAMPLE 12

This example illustrates the use of the detergent removal process of this invention in a secondary sewage treatment system. This secondary treatment system follows the same procedure as the primary treatment system of Example 11 to the point where the high gravity solids have been removed, i.e., through step 3 of that process. In the secondary treatment system, however, the overflow from the primary settling tank is treated by the addition of activated sludge, and is then routed to an incubation and settling tank where time is permitted for aerobic and anaerobic bacterial action.

Overflow from the incubation and settling tank is either transmitted to a secondary settling tank where additional sediment is removed by decantation, or it is treated by additional aeration and trickle filtration through sand and gravel beds. The product from this step is treated by a conventional chlorination process prior to its discharge from the treatment plant.

In the secondary treatment system, the resinous detergent removal agent of this invention is added to the waste water at the overflow from the high gravity settling tank, prior to the addition of the activated sludge. Addition at this point permits its maximum retention time in the overall system and allows full advantage to be taken of its inherent foam reduction action.

In this example, about 466 pounds per day of the detergent removal resin produced in Example 1 are added to a secondary treatment system which processes about 6,000,000 gallons of waste water per day. The water entering the system has an alkyl benzene sulfonate detergent content of 15 p.p.m., and the secondary treatment system utilizes a sludge recycle of 60,000 gallons per day. The process of this invention is found to reduce the alkyl benzene sulfonate detergent content of the water exiting this secondary treatment system to an average of 0.5 p.p.m.

EXAMPLE 13

An amine compound prepared by the procedure of Example 1 is added at the rate of 5 p.p.m to the secondary treatment section of an activated sludge sewage treatment plant (7–12 million gals/day) for a period of 16 days. The chromate content (expressed as $Cr_2O_4$) of the influent stream to the plant averages 0.16 p.p.m. during this period, but the average chromate content of the effluent from the plant is reduced to 0.00 p.p.m. by the removal agent of this invention.

This test is continued for an additional 11 day period using a dosage rate of 10 p.p.m. of the polymer of Example 1. The average chromate content of the influent stream is 0.25 p.p.m. during this period, while the average chromate content of the effluent is only 0.03 p.p.m. Examination of the influent and effluent streams of the same treatment plant processed without using the contaminant-removal polymer of this invention shows no reduction or removal of chromates at levels above 0.25 p.p.m. chromates and only 40–70% range of reduction when influent chromate concentration is 0.10 to 0.15 p.p.m.

EXAMPLE 14

To raw influent sewage processed in a 10.4 million gal./day activated sludge treatment plant is added 5 p.p.m. of polymer described in Example 3. The average phosphate content of the influent and effluent streams of the plant is obtained on a 24 hour composite sample of the stream flows. The average phosphate content of the influent sewage is found to be 22.5 p.p.m., and the average phosphate content of the treated effluent is reduced to 5.0 p.p.m.

All phosphate tests are run according to Standard Methods for the Examination of Water, Sewage, and Industrial Waste, 10th edition, pp. 169–170.

EXAMPLE 15

The influent waste water stream to a primary sewage treating plant (3–5 million gal./day capacity) is split into two parallel streams with one of the streams being treated with 20 p.p.m. of the amine polymer produced in Example 4, and the other stream being processed by conventional means without addition of any of the contaminant removal agents of this invention. The total dissolved solids content of the effluent streams, determined on daily composite samples, are as follows:

| | Treated effluent, p.p.m. | Untreated effluent, p.p.m. |
| --- | --- | --- |
| 1st day | 289 | 319 |
| 2nd day | 201 | 237 |

EXAMPLE 16

In this example a 20 day run is made in a secondary sewage treatment plant (activated sludge), having a plant flow of about 7.0 million gal./day. The contaminant removal agent used in this run is 5 p.p.m. of the amine polymer of Example 2.

The total volatile solids content of the raw sewage influent stream to the plant averages 189 p.p.m. over the test period, but the total volatile solids content of the effluent from the plant is only an average of 94 p.p.m.— a 50.4% removal of volatile solids.

EXAMPLE 17

Ten (10 ml. of a 1.0% potassium dichromate solution is added to 125 ml. of tap water to make 135 ml. of a 750 p.p.m. chromate solution. To this solution is added 5 ml. of a 1% solution of the polymer prepared in Example 4. An immediate cloud and haze develops in the solution and a heavy flocculent yellow precipitate is formed on standing. The supernatant liquid is clear and yellow and has a potassium dichromate content of 300 p.p.m.

The test method used in this example for determining chromate content is Standard Method for the Examination of Water, Sewage, and Industrial Waste, 10th edition, pp. 84–85.

EXAMPLE 18

Ten (10) ml. of a 1% solution of the polymer prepared in Example 4 is added to 100 ml. of 0.5% solution of ammonium molybdate $[(NH_4)_6Mo_7O_{24} \cdot 4H_2O]$.

A flocky rapidly settling, white precipitate is formed almost immediately.

EXAMPLE 19

To 250 ml. of a 50 p.p.m. solution of orthophosphoric acid is added 0.25 ml. of a 10% solution of the polymer prepared in Example 4. The mixture is shaken to mix and 2.0 ml. of a 1% alum solution is added and the mixture allowed to stand 16 hours. Analysis for phosphate in the clear supernatant liquid indicates 8 p.p.m. remaining in solution. A control test run concurrently using only alum shows no reduction in the phosphate content of the clear supernatant liquid.

EXAMPLE 20

To 250 ml. of a 50 p.p.m. solution of disodium hydrogen phosphate is added 1.0 ml. of a 10% solution of the polymer prepared in Example 4. A cloudy mixture is obtained which settles into a white precipitate and a clear supernatant liquid after standing overnight. The phosphate content of the supernatant liquid is 15 p.p.m.

EXAMPLE 21

Four (4) ml. of 1000 p.p.pm. stock solution of phenol is charged to a 250 ml. graduated, stoppered cylinder. Tap water is added to adjust volume to 250 ml. of a 15 p.p.m. phenol solution. This solution is treated with 4 ml. of a 1000 p.p.m. stock solution of the polymer prepared in Example 4. One (1.0) ml. of a 5% alum solution is added and the mixture is stirred. The pH of the solution is adjusted to between 7.0 and 7.5. Floc formation is observed and after two hours a sample of the clear supernatant liquid is withdrawn from the top cyclinder for analysis. The analysis shows the supernatant liquid to have a phenol content of 2.8 p.p.m.

EXAMPLE 22

Samples of a digester sludge from a municipal primary sewage treatment plant are treated with 5% and 8% of the cationic, amine polymer prepared in Example 1 and then filtered through a Buchner funnel. The amount of liquid filtrate removed from each sample is measured and compared to an untreated control sample of the same sludge. The results of these tests are plotted as "percent water removed from the sludge vs. time" in the graph shown in the drawing. It can be seen from this graph that substantially improved filtration is achieved in the sludge samples treated with the resins of this invention.

The invention in its broader aspects is not limited to the specific steps, methods and compositions described, but departures may be made therefrom without departing from the principles of the invention and, without sacrificing its chief advantages.

What is claimed is:

1. A process for the removal of water-soluble inorganic and organic contaminants selected from the group consisting of synthetic organic detergents, phosphate salts, borate salts, chromate salts, molybdate salts, phenols and substituted phenols from a waste water system which comprises: treating the waste water system containing at least one of the water-soluble contaminants with a water-soluble cationic, amine-aldehyde resin selected from the group consisting of (a) polyamine modified urea-formaldehyde resins, and (b) melamineformaldehyde resins to form insoluble flocculates of the resin with said contaminant, and separating said contaminant-containing flocculates from the water system.

2. The process of claim 1 in which the resin-contaminant flocculates are allowed to settle toward the bottom of said waste water system and are then separated from the water in said system.

3. The process of claim 1 in which said waste water system contains insoluble as well as soluble contaminants.

4. The process of claim 1 in which the amine-aldehyde resin is a polyamine-modified urea-formaldehyde resin.

5. The process of claim 4 in which the polyamine modifier is selected from the group consisting of dicyandiamide, diethylene triamine and melamine.

6. The process of claim 1 in which the amine-aldehyde resin is a melamine-formaldehyde resin.

7. The process of claim 1 in which alum is also added to the waste water system to increase the rate of removal of the contaminants.

8. The process of claim 1 wherein the contaminant to be removed from the system includes at least one inorganic material selected from the group consisting of phosphate, chromate, molybdate and borate salts.

9. The process of claim 1 wherein the contaminant to be removed from the system includes at least one organic material selected from the group consisting of phenols, and substituted phenols.

10. The process of claim 1 in which the contaminant to be removed from the system includes a synthetic organic detergent.

11. The process of claim 10 in which the contaminant to be removed from the sytem includes a sulfonate detergent selected from the group consisting of alkyl benzene sulfonates and linear alkyl sulfonates.

References Cited

UNITED STATES PATENTS

| | | | |
|---|---|---|---|
| 3,171,805 | 3/1965 | Sven et al. | 210—54 |
| 3,131,144 | 4/1964 | Nagan | 210—54 |
| 3,300,406 | 1/1967 | Pollio | 210—52 |
| 3,345,841 | 10/1967 | Phelan et al. | 210—54X |
| 3,389,081 | 6/1968 | Eckenfelder et al. | 210—54X |

MICHAEL E. ROGERS, Primary Examiner

U.S. Cl. X.R.

260—72, 67.6; 210—54, 10